(12) United States Patent
Ruetenik

(10) Patent No.: US 10,292,378 B2
(45) Date of Patent: May 21, 2019

(54) ADJUSTABLE EQUINE BOOT ROCKER ATTACHMENT

(71) Applicant: Monty L. Ruetenik, Clear Lake City, TX (US)

(72) Inventor: Monty L. Ruetenik, Clear Lake City, TX (US)

(*) Notice: Subject to any disclaimer, the term of this patent is extended or adjusted under 35 U.S.C. 154(b) by 120 days.

(21) Appl. No.: 15/285,399

(22) Filed: Oct. 4, 2016

(65) Prior Publication Data

US 2017/0172134 A1 Jun. 22, 2017

Related U.S. Application Data

(60) Provisional application No. 62/268,841, filed on Dec. 17, 2015.

(51) Int. Cl.
*A01K 13/00* (2006.01)
*B68B 7/00* (2006.01)
*A01L 15/00* (2006.01)
*A01L 7/02* (2006.01)

(52) U.S. Cl.
CPC .............. *A01L 7/02* (2013.01); *A01K 13/007* (2013.01); *A01L 15/00* (2013.01); *B68B 7/00* (2013.01)

(58) Field of Classification Search
CPC ............ A01L 7/02; A01K 13/007; B68B 7/00
USPC .................................. 168/18, 26, 27; 54/82
See application file for complete search history.

(56) References Cited

U.S. PATENT DOCUMENTS

| 593,564 | A | * | 11/1897 | Cain | A01K 13/007 168/2 |
| 594,080 | A | * | 11/1897 | Hennessy | A01L 7/02 168/28 |
| 809,144 | A | * | 1/1906 | Singleton | A01L 7/02 168/28 |
| 1,212,266 | A | * | 1/1917 | Schrader et al. | A01L 5/00 168/12 |
| 4,183,156 | A | * | 1/1980 | Rudy | A43B 17/035 36/29 |
| 5,692,570 | A | * | 12/1997 | .ANG.kesson | A01L 7/02 168/28 |
| 5,741,568 | A | * | 4/1998 | Rudy | A43B 7/141 36/28 |
| 6,122,901 | A | * | 9/2000 | Schultz | A61D 9/00 168/27 |
| 7,254,906 | B2 | * | 8/2007 | Morris | A43B 7/06 36/27 |
| 7,712,365 | B1 | * | 5/2010 | James | A61B 5/0002 340/573.1 |
| 2005/0072128 | A1 | * | 4/2005 | Ruetenik | A01K 13/007 54/82 |
| 2005/0278978 | A1 | * | 12/2005 | Swigart | A43B 7/144 36/29 |
| 2007/0114045 | A1 | * | 5/2007 | Morris | A01L 7/02 168/14 |
| 2008/0156503 | A1 | * | 7/2008 | McSherry | A01K 13/007 168/2 |
| 2010/0223893 | A1 | * | 9/2010 | D'Arpe | A01L 15/00 54/82 |

(Continued)

*Primary Examiner* — Son T Nguyen
(74) *Attorney, Agent, or Firm* — Douglas Baldwin

(57) ABSTRACT

A "rocker" attachment for an equine boot with an adjustable shaped structure that attaches to the underside of a sole of an equine boot and allows the boot to rock forward—breakover—when tilted, as by movement of the equine leg, thus allowing the equine to find a naturally comfortable position.

11 Claims, 9 Drawing Sheets

(56) References Cited

U.S. PATENT DOCUMENTS

| | | | | |
|---|---|---|---|---|
| 2011/0197554 A1* | 8/2011 | Ruetenik | ............ | A01K 13/007 54/82 |
| 2012/0279184 A1* | 11/2012 | Ruetenik | ............ | A01K 13/007 54/82 |
| 2013/0129056 A1* | 5/2013 | Ovnicek | ............ | A61B 6/04 378/208 |
| 2014/0317959 A1* | 10/2014 | Elbaz | ............ | A43B 3/02 36/88 |

* cited by examiner

ADJUSTABLE EQUINE BOOT ROCKER ATTACHMENT

CROSS REFERENCE TO RELATED APPLICATIONS

This application claims benefit of Provisional Patent Application Ser. No. 62/268,841 filed Dec. 17, 2015, the contents and disclosure of which is incorporated herein by reference in its entirety for all purposes.

BACKGROUND

Field of Invention

This invention relates to equine boots and more specifically to adjustable rocker attachment(s) for equine boots.

Background

In the treatment of equine hoof and leg maladies, especially laminitic equine, it is considered important to provide means to allow the equine to be able to reduce hoof pressure from sharp break-over of the hoof when walking and to allow it to find its own most comfortable standing position. This can be accomplished by so called "rocker" shoes. One commercial shoe that has found acceptance is sometime called a "banana" or "rocker" shoe or clog. This is a shoe that is shaped to allow break-over adjustment by a "rocker" effect of the sole of the hoof so that the horse can more easily find a comfortable position—by adjusting the palmar/planar angle to take pressure and stress off affected areas of the hoof. The "Clog" is a shoe developed by Dr. Micheal L. Steward, DVM of Oklahoma is one of the first to use the concept of a self-adjusting in a wooden shoe that is screwed and/or glued directly to the hoof. Adaptations of the Stewart Clog have been made of other than wooden materials. These shoes, while somewhat effective are generally attached directly to the hoof and are not, therefore, easily changed or adjusted without damage to the hoof. Another rocker attachment for equine boots is described in US published application US 2015/0325944, filed Jul. 17, 2015, the disclosures if which are incorporated herein by reference.

The present invention is an adjustable rocker attachment and boot assembly that is efficient, easily applied without the assistance of an expert farrier and can be utilized directly by an equine owner or its veterinarian.

DETAILED DESCRIPTION OF EMBODIMENTS

The "rocker" attachment of the present invention comprises an attachable adjustable shaped structure that attaches to the underside of the sole of an equine boot. It allows the boot to rock forward—break-over—when tilted, as by movement of the equine leg, thus allowing the equine to find a naturally comfortable position. Unlike "rocker" attachment structures that are fixed in shape, the structure of the present invention is adjustable in shape by use of an inflatable bladder disposed on the top side of the structure between the structure and the underside of a boot sole. Horses that are lame, by laminitis or otherwise, will naturally seek a comfortable standing position. When standing, walking or running the horse will greatly benefit from the ability of the boot, and thereby the hoof, to roll forward or backward without unnecessary bending that puts pressure on the toe of the hoof. The "rocker" attachment and boot of the present invention accomplices that. By moving the break-over (lever-arm of the hoof) back from the front of the hoof, pressure is unloaded from the hoof wall so that the hoof lamina does not have to do all the work of holding the bony column of the hoof and leg to the furthest point out toward the front of the hoof. Without a rocker shoe or boot the pressure in on the front hoof wall when the hoof is tilted forward. Break-over, as the term is used herein, is the last point of the hoof or shoe to come off the ground when the horse is moving. The further forward the break-over is, the more levering affect there is placed on the foot and potential strain on the entire back portion of the limbs. The adjustable "rocker" structure can be very suitably coupled with equine boot assemblies having an elastomer gel orthotic pad and is especially effective when coupled with an equine exercise boot assembly such as that of U.S. Pat. No. 8,291,683, issued Oct. 23, 2012, the disclosure of which is incorporated herein by reference.

In broad scope the adjustable "rocker" structure of the present invention is a shaped structure, preferable with the underside sloped from the center to the front and rounded at the rear, having an inflatable bladder (wedge) disposed on the top side, optionally in a recess (cavity) in the top side of the structure.

Figure 1:
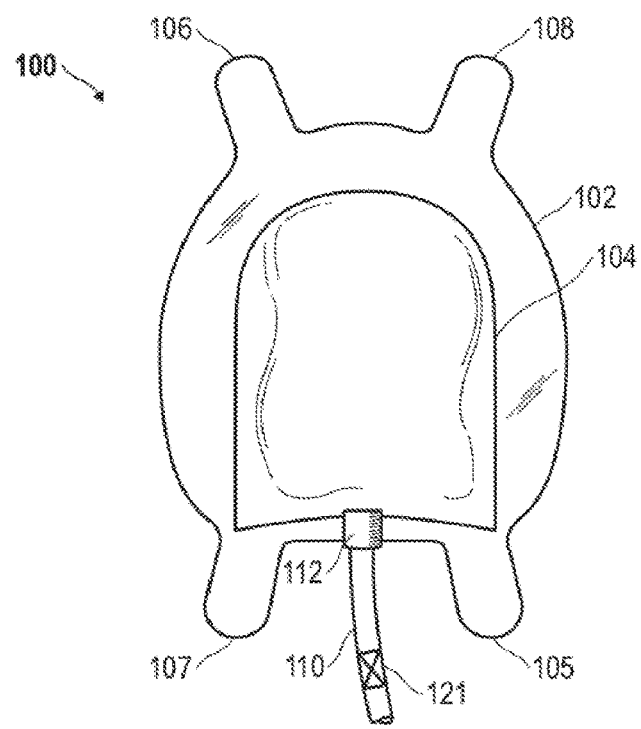
FIG. 1 is a top view of an embodiment of a structure of the invention.
Figure 1A:
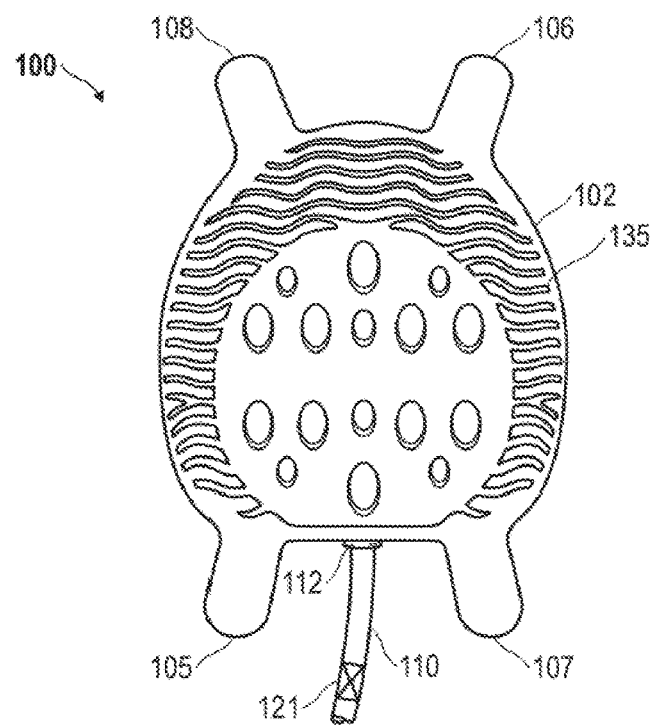
FIG. 1A is a bottom view of an embodiment of a structure of the invention.
Figure 2:
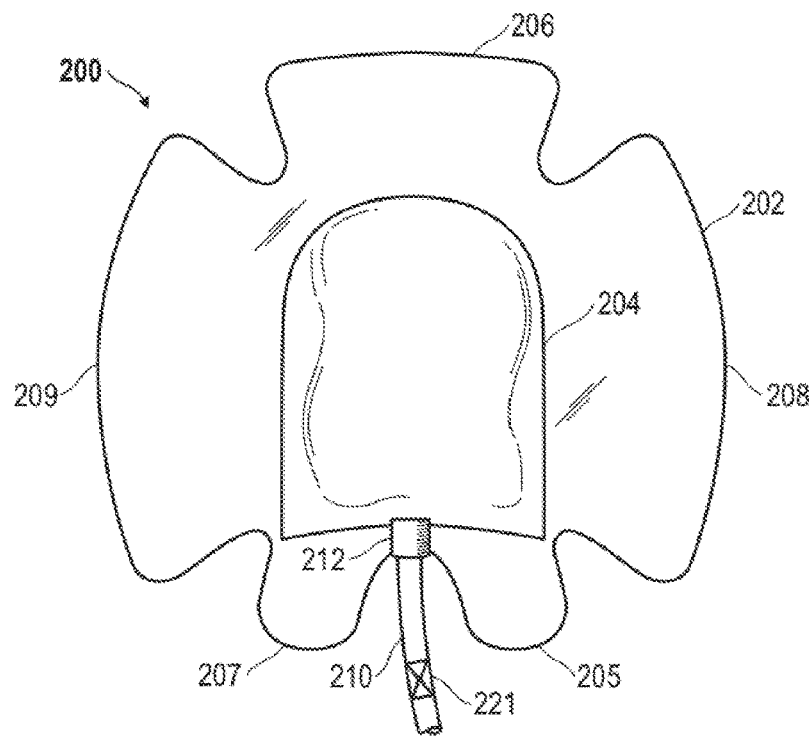
FIG. 2 is a top view of an embodiment of a structure of the invention.
Figure 10:
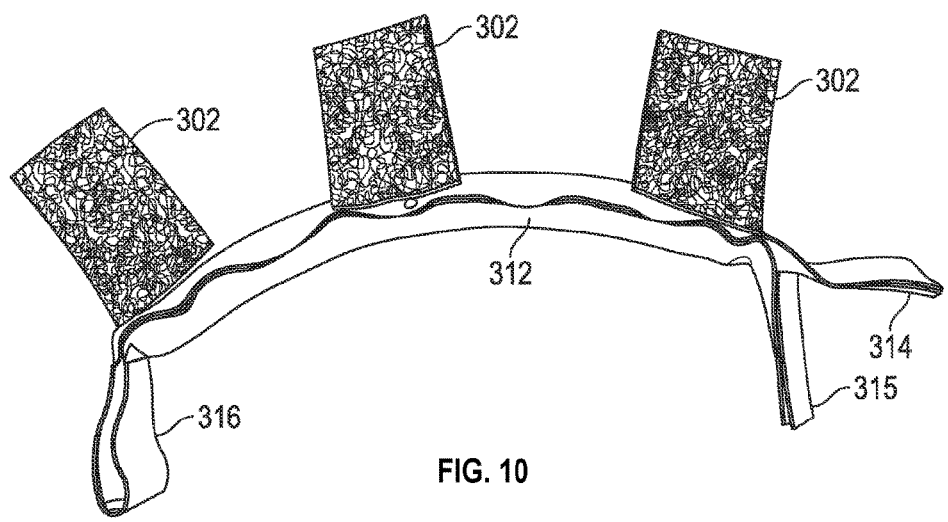
FIG. 10 is a perspective view of a leg retaining collar of an embodiment of the invention.

Referring to the Figures, FIG. 1 is a top view of an embodiment of a structure of the invention. FIG. 2 is a bottom view. The structure 100 has an elastomeric body 102 with tabs 106, 108, 105 and 107. There are at least three tabs and preferably four or more. It is preferred that the tabs be integral with the body of the structure as shown but they may also be attached as separate pieces. They may be attached by adhesive, by threading through slots in the top portion of the body or any other suitable means. However, they must be elastic. The structure is made of an elastic polymer that must be sufficiently hard to withstand wear and must be sufficiently elastic (stretchable) to allow it to stretch as required (as discussed below). An elastomer of Shore A hardness of about 70 to 100, with 80 to 95 is especially suitable. It is essential that the structure have at least about 400% elasticity (can be stretched to 4 times its original length). Elasticity of about 400% to 800% is desirable. These values are definitional and not merely a selection from a known range of values (there is no known range). A prototype was made with a polyurethane polymer having a Shore A of about 90 and elasticity of 680%. The tabs are shown attached to the structure in the 1, 11, 5 and 7 clock position. This arrangement is very suitable for attachment to front and rear side walls of a boot. Other tab locations (as on the sides) may also be used. In a prototype, tabs one inch long (measured from the body of the structure) and one inch wide were used. Other sizes are suitable. FIG. 1A shows a patterned (135) underside of the structure. Patterning is desirable to provide a good grip of the structure on the ground surface when the structure is use. A very suitable patterned design for the underside of the structure is shown in FIG. 10 and in Design Pat. D565,256, issued Mar. 25, 2008, the disclosure of which is herein incorporated by reference. This pattern design allows for excellent traction by the slanted ridges on the front and rear of the sole and more flexibility in the center. This flexibility provides more comfort for a horse with an injured or diseased hoof. Other designs and cleat arrangement will be well within the skill on those in the art.

Also shown in FIGS. 1 and 1A is an inflatable rocker attachment bladder (or bag) wedge, 104, that is used to adjust the shape of the structure. The bladder (wedge) has a connection 112 and conduit 110 to allow filling and release of filling fluid. There is also provided a valve 121. The bladder as shown is disposed in a recess (cavity) in the top side of the structure. This is desirable but not essential for the invention. The valve connection as shown is arranged to exit the structure at the rear. In some embodiments it is preferred that the conduit exit the side of the structure to allow it to be attached to a conduit along the side of a boot.

The bladder wedge is a flexible bladder or bag that may be expanded by injecting fluid or gas and has an outlet conduit connection 112 and conduit 110. A prototype was made on TPU coated fabric that was rf welded together to form an air tight bag. The bladder is disposed on the top side of the attachment (104 in FIG. 1). The bladder may also be molded into the attachment 100 as an integral bag-like space (container) in the pad. One or more bladders may be used. The location, shape and size of the bladder may be varied to provide the most effective action, which will vary with the condition of the hoof and the desired effect. While the invention has been described herein with the bladder located near the heel of the boot sole, bladder(s) may also be place under the middle or toe section or sides of the boot sole.

In general, the volume of the bladder will be sized from about one hundred (100) to about five hundred (500) mL (6.10-30.51 cubic inches); therefore, the amount of fluid required to inflate need not be great, and the pressure system can easily be battery powered and carried by the horse.

Required pressure to inflate the bladder is not excessive—pressures from nearly zero to about two hundred seven (207) kPa (0+ to 30 psi) are effective for inflating the bladder with pressures from about twenty-one (21) to one hundred thirty-eight (138) kPa (3-20 psi) being preferred. The suitable pressure required for any size and configuration can be easily tested and will generally be sufficient to expand about 0.5 to 1.5 inches.

The bladder will have at least one inlet port, 112, and conduit 110. Generally, only one port is required. When air or other gas is the pressurizing fluid the bladder can be both pressurized and depressurized by venting, as through a two-way valve, 121, or as through a conduit fitted with a pressure relief valve or other pressure relief means. The preferred valve, 121, type for the bladder inflation is those valves used in tires—SCHRADER or American valves or PRESTA valves are suitable and preferred for higher pressures and when the bladder is to remain inflated for longer periods of time. Both these valves types allow the bladder to be easily inflated with air (as from an air pump such as a customary tire pump) and easily deflated. They also aid in making the assembly lightweight and portable without the need for external power sources.

Figure 5:
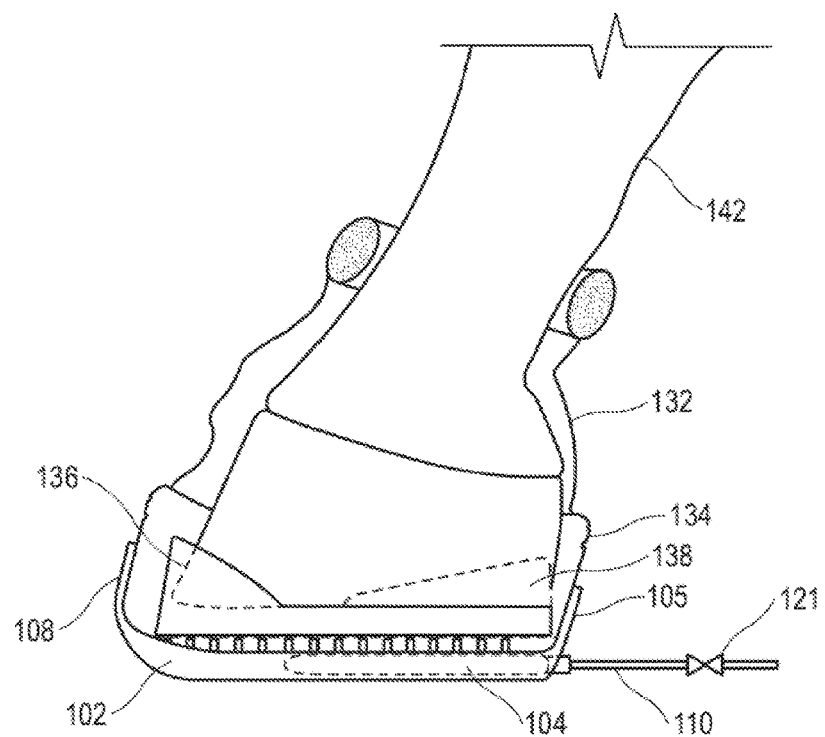
FIG. 5 is a side view of an assembly of an embodiment of the invention with a bladder wedge in an uninflated condition.
Figure 6:
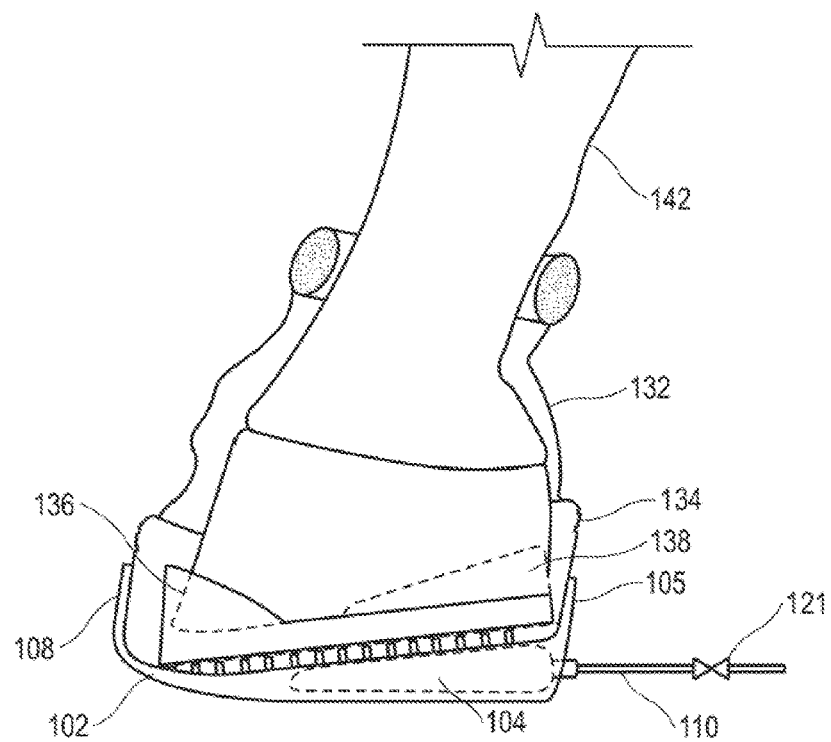
FIG. 6 is a side view of an assembly of an embodiment of the invention with a bladder wedge in a partially inflated condition.
Figure 7:
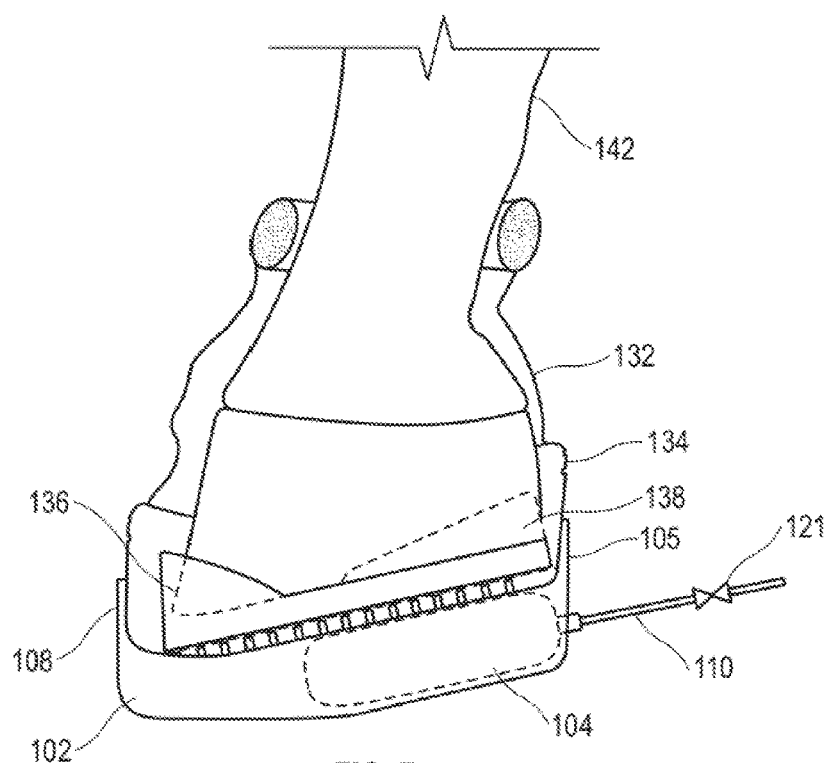
FIG. 7 is a side view of an assembly of an embodiment of the invention with a bladder wedge in more inflated condition.

The structure is fitted on the underside of an equine boot sole as shown in FIGS. 5-7 where structure 102 is disposed on the underside of an equine boot 132 and the tabs 105, 107, 106 and 108 are folded up to attach the side wall, 134, of the boot sole. The tabs may be attached to the side wall by any suitable means including adhesive, hook and loop fasteners, brads or bolts and nuts. Barrel nuts placed inside and through the boot wall with bolts (109 and 103 of FIG. 2) on the outside make a very convenient detachable connection. The combination of the attachment structure, bladder wedge and boot, form the adjustable shape rocker attachment assembly of the invention. As can be seen by comparing FIGS. 5, 6, and 7 as the bladder is inflated the structure become more rounded to provide a more pronounced "rocker" shape. The elasticity of the structure and tabs allow them to stretch as the shape is changed by the inflated bladder while the structure remains firmly attached to the boot sole underside. Thus, by selection of the degree of bladder inflation the shape of the rocker structure is adjusted to a desired shape. Some practitioners believe that it is desirable to have a relatively flat structure (as with the at bladder uninflated) when an equine is at rest as at night but a more pronounced rounded shape when the equine is active. The more rounded shape make "break-over" smoother and improves the ability of an active equine to find a comfortable hoof position. Moreover, the adjustment allows practitioners to adjust the hoof angle of an injured hoof when treating for disease such as laminitis (as further discussed below). It is often helpful to have radiographs of the hoof at different adjustment shapes to judge the desired effect on the hoof.

Figure 2A:
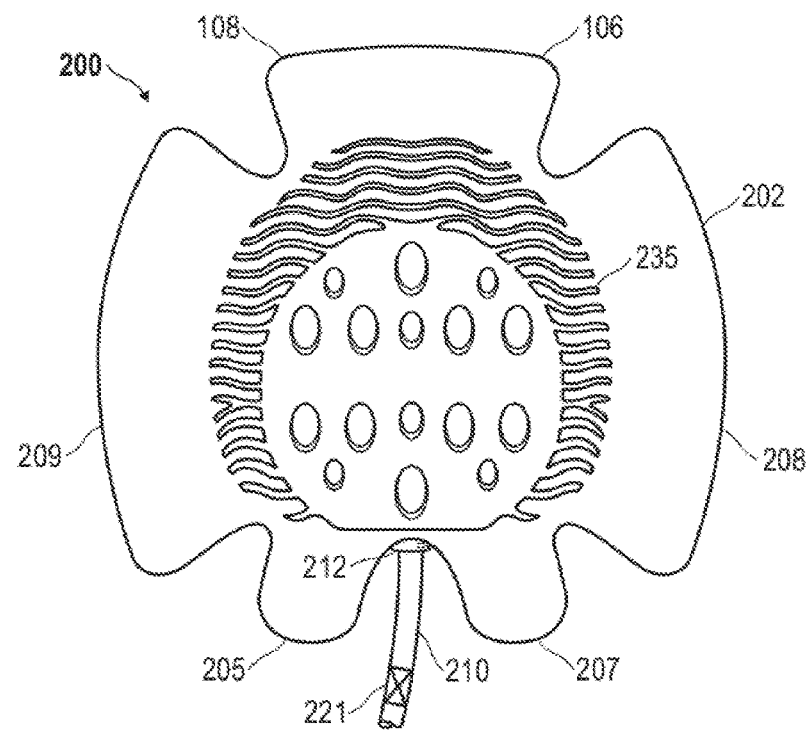
FIG. 2A is a bottom view of another embodiment of a structure of the invention.
Figure 3:
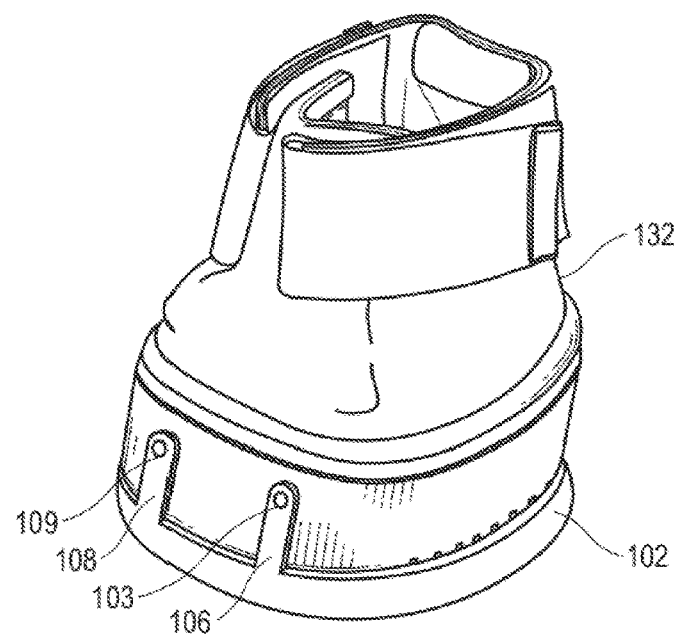
FIG. 3 is a perspective view of an embodiment of a structure of the invention attached to an equine boot to form an assembly.
Figure 4:
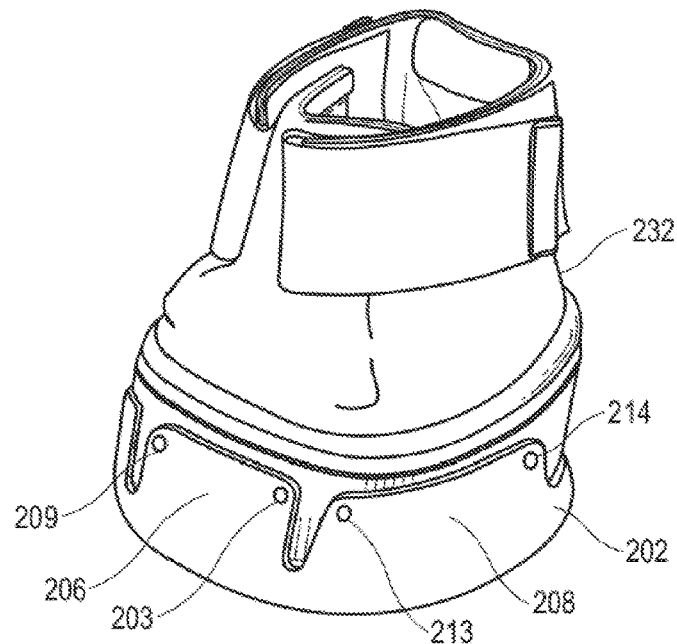
FIG. 4 is a perspective view of another embodiment of a structure of the invention attached to an equine boot to form an assembly.

An alternative structure with enlarged tabs are shown FIGS. 2, 2A and 4. The structure, 200, is as described in FIGS. 1, 1A and 2 except that the tabs are broadened. The structure has tab 206 in front, 207 and 205 in the rear and 208 and 209 on the sides of the body 202. The inflatable bladder 204 is disposed as in the structure of FIGS. 1, 1A and 2. The conduit 210 and fitting 212 and valve 221 are the same as described above. The tabs can be attached as described above including with barrel nuts and bolts 203, 209, 213 and 214. These broadened tabs help to prevent soil from getting between the structure and boot underside when in use.

In another embodiment the structure illustrated in FIGS. 2, 2A and 4 can be adapted to form a sandal that may be used with or without the inflatable bladder and without an equine boot as described herein. In this embodiment, the structure would be attached directly to an equine hoof and a secured by laces, hook and loop straps, adhesive or similar means to the equine hoof. The side tabs may also be fitted on the inside surface with one half of hook and loop straps set and attached to mating straps in a leg collar as described in U.S. Pat. No. 9,055,732, issued Jun. 16, 2015, the disclosure of which are incorporated herein by reference. See particularly, FIGS. 15-18 of U.S. Pat. No. 9,055,732

The invention is desirably coupled with a suitable equine boot to comprise an adjustable rocker/boot assembly. In one or more embodiments the boot assembly of the invention works very well with commercially available boot systems and very effectively with equine boots and boot/pad assemblies described in U.S. Pat. No. 7,178,321, issued Feb. 20, 2007, U.S. Pat. No. 7,445,051, issued Nov. 4, 2008, U.S. Pat. No. 8,166,734, issued May 1, 2012, U.S. Pat. No. 8,220,231, issued Jul. 17, 2012, U.S. Pat. No. 8,291,683, issued Nov. 23, 2012, U.S. Pat. No. 8,656,691, issued Feb. 24, 2014, U.S. Pat. No. 9,055,732, issued Jun. 16, 2015, 2014 U.S. Pat. Application No. 2015/0325944, U.S. Pat. Application No. 2015/,0119772, U.S. Design patents: D565256, issued Mar. 25, 2008, D62508, issued Mar. 25,2014, issued Mar. 25, 2008 D33013, issued Jul. 22, 2014 the disclosures of which are incorporated herein by reference. The sloped front and rear of the boot sole described in these patents and applications provides a more gentle and beneficial break-over than conventional shoes or boots. In some embodiments the sole of the boot is narrower in the front (as is generally preferred) lateral break-over is also enhanced. The present invention allows ready customization and adjustment of the break-over point.

In general, the boots described in the above patents and applications that are suitable for use with adjustable rocker attachment of this invention comprise an upper portion made from flexible material shaped to fit the hoof of an animal and of a height to reach above the hoof of the animal for which it is designed (see 132 and 142 of FIGS. 5-7). The boot have a front, sides, rear and bottom; the front slopes back and upward, the sides are lower than the front and rear so that when the front and rear are pulled together here is an opening in the sides. There is a fastening means at the top front and rear to fasten the front and rear together around the leg of a horse. The fabric bottom is attached to a more rigid sole plate comprising a molded elastomer base entirely circumscribed by a peripheral wall (or sides) defining a receiving area sized to fit over (or under) the bottom of the upper portion; said sole plate being securely attached to the lower circumference of the upper portion. The fabric bottom disposed in the molded base is beneficial as it facilitates attachment of an orthotic pad (136 and 138 of FIGS. 5-7) and provides a more rugged and trouble free boot structure. The adjustable attachment may also be attached to other commercial equine boots. In some commercial boots, the rear of the boot is open. In that case the tabs of the attachment would need to be disposed on the side, rather that front and rear of the attachment body.

U.S. Pat. No. 9,055,732 discloses an ice spa boot assembly that is also a suitable boot for use with the adjustable rocker attachment disclosed herein. The bladder wedge may be placed beneath the boot sole just as in the boots of the other identified patents and provides the added benefit of ice spa treatment with the heel lift of the present invention. The disclosure of U.S. Pat. No. 9,055,732 is incorporated herein by reference for all purposes.

The adjustable rocker attachment may be also be usefully coupled with the simulated exercise boot assembly of U.S. Pat. No. 8,291,683, issued Oct. 23, 2012, the disclosure of which is incorporated herein by reference.

Figure 8:
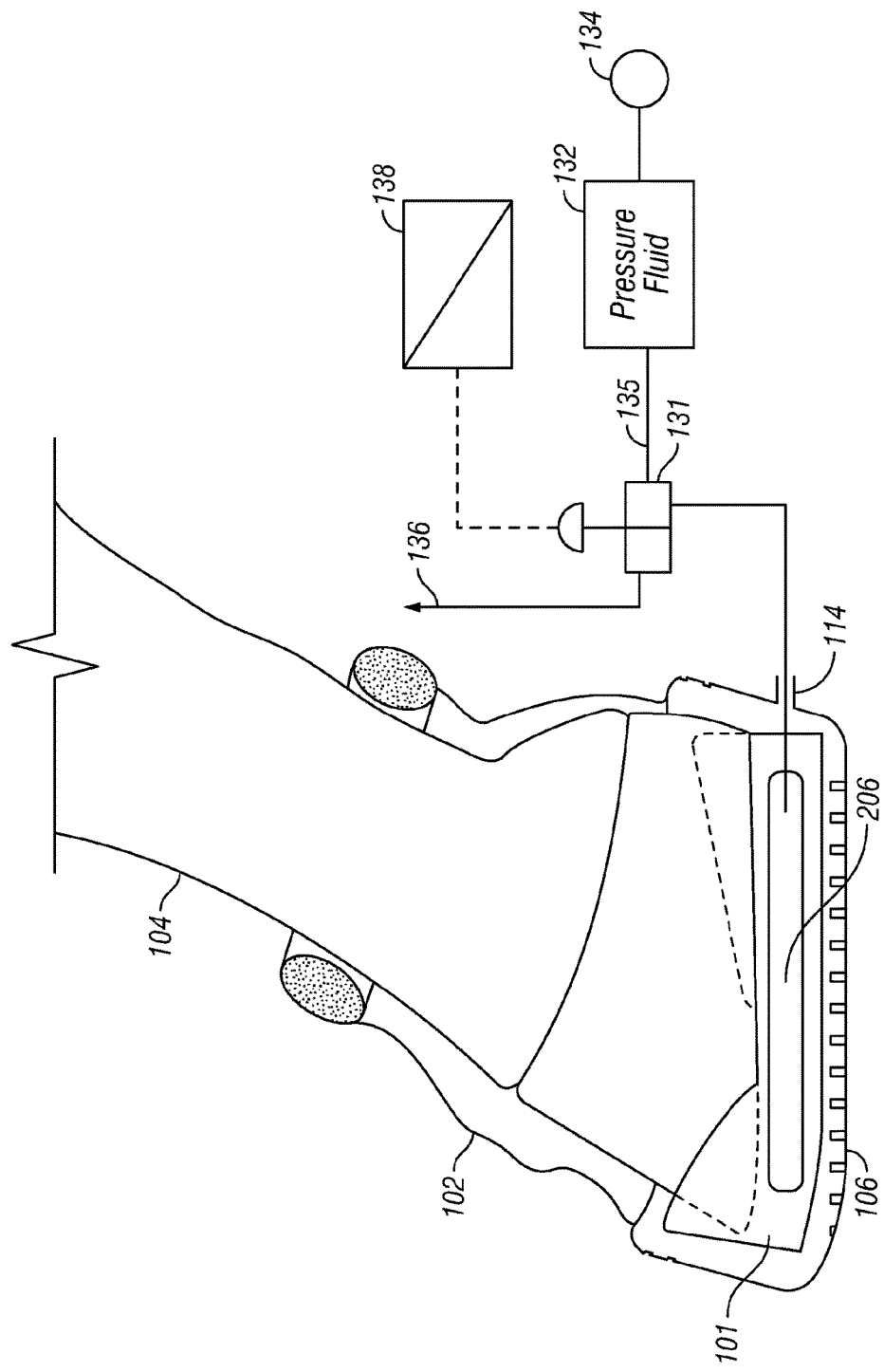
FIG. 8 is an illustration of a boot sole plate with a rocker attachment.

FIG. 8 shows conduit 135 leading from the pressure source 132 through a three way valve 131 which is attached to the pressuring bladder 206. The pressure source, 132, may be a pressure pump, air compressor, a vessel held at constant pressure or the like. Only one hoof system is shown but generally there will be a system for each of the four hooves as shown in FIG. 9.

In general, the simplest system of the invention will use air as the pressure fluid and use only one conduit. Air passes to the pulsing means by the single port to pressure the pulsing means. When pressure is released by venting through conduit 136 when the pressurized fluid is closed off, the pulsing means deflates. The pressure is simply vented or directed to pressure another hoof pulsing means. The air or other fluid may also be circulated by conduit to the pressure source, as to the inlet of a compressor. The single port pulsing means and use of compressed air is the simplest embodiment of the invention and works effectively.

Figure 9:
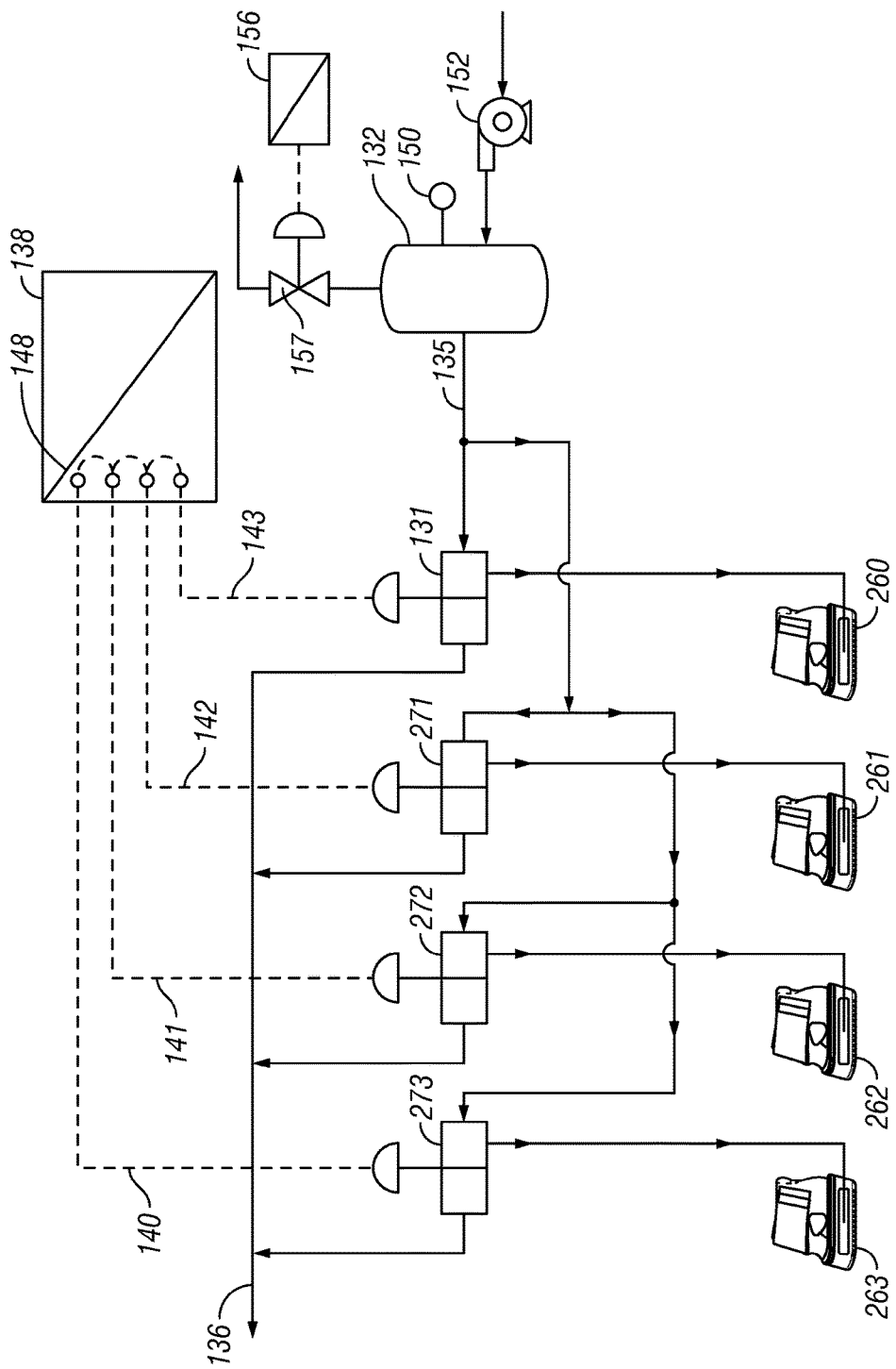
FIG. 9 is a schematic diagram of an embodiment of a control system of the pulsing means, with a pressure source, monitor and valving for four hooves.

FIG. 9 illustrates a system of the invention for connection to and control of pulsing means on all four hooves of a horse —the preferred and most useful configuration for the invention. Shown is a pressure source 132 with a pressure gage 150 and pump or compressor 152 to maintain constant pressure in the source 132. Valve 157 will release excess pressure. The valve is controlled by controller 156. Pressured air, gas or liquid is passed to three way control valves 131, 271, 272 and 273 through conduit 135. The controller 138 controls the valves in a fixed or adjustable sequence to simulate the desired gait of a horse. Pressure fluid passes to boot bladders 260, 261, 262 and 263 to inflate and deflate the bladders. The fluid may be vented via conduit 136 or, alternatively, may be recycled to the pressure source, as through the inlet to pump 152. Also, if the bladders have two ports (as described above) the fluid may be returned from the bladder to the pressure source. In one embodiment the pressure fluid will be coolant that is maintained at a low temperature. The coolant fluid will be circulated through the bladder, and perhaps cooling tubes around the legs to lower the blood temperature. Details of such a hoof and leg cooling system are described in patent application Ser. No. 12/581, 620, filed Oct. 19, 2009, Publication No. US 2010-0095641, the description incorporated here by reference.

Figure 11:
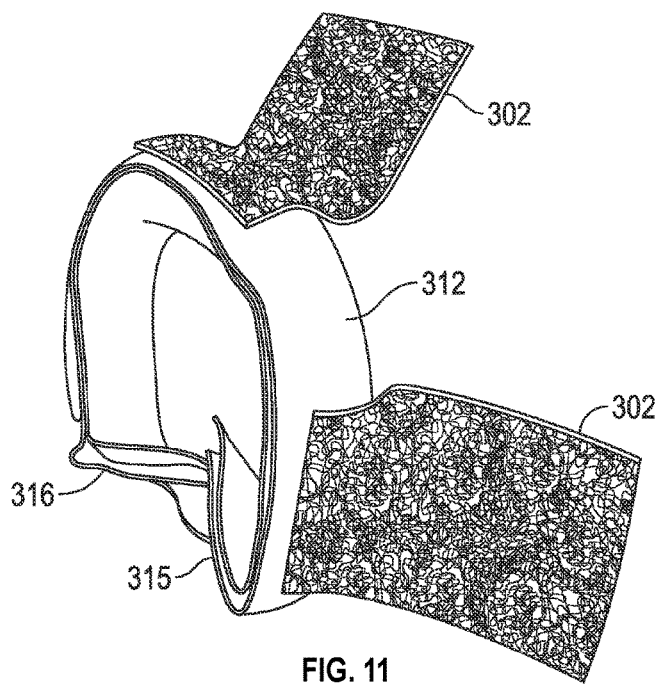
FIG. 11 is a perspective view of a leg retaining collar of an embodiment of the invention.
Figure 12:
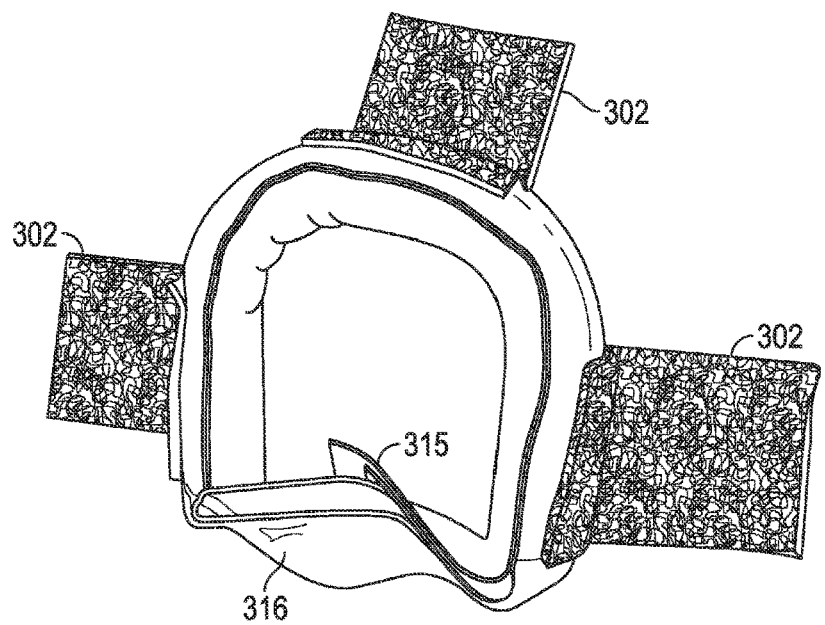
FIG. 12 is a perspective view of a leg collar of an embodiment of the invention.
Figure 13:
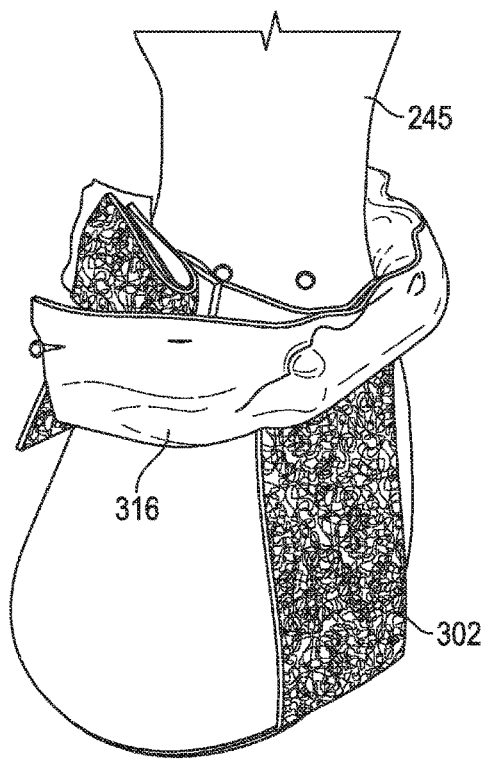
FIG. 13 is a perspective view of a leg collar attached around a simulated equine leg with hook and loop straps to attach to matching hook and loop strap in a boot.

Equine Leg Collar:

An important aspect of the sandal of this invention is the inclusion of means to removably secure the equine leg and hoof to the sandal so that when the equine lifts its leg the sandal will remain attached. Referring to FIGS. 10-13, there is a soft fabric member 312 including tabs 314, 315, and 316 to which is attached three hook and loop straps 302. These straps are designed to hold the collar into a circle around an equine leg, 245 (FIG. 13) and straps attach to matching straps in an equine sandal. This collar will generally be a fold of fabric sewn together and may have a foam rope inside to aid in attachment around the leg and in preventing chafing and other damage to the skin of the leg. The relative location of an embodiment is as shown (at positions 2, 6 and 10 o'clock, based on clock face). The collar, 312 of FIG. 10-11 is placed around the equine leg, 245, as illustrated in FIG. 13. The collar is attached to the leg and the leg and hoof placed in position on the sandal and the hook and loop straps of the collar (312) are attached to the straps on the sandal. There are optionally provided tabs to facilitate alignment and proper attachment of the loops. The straps on the sandal and on the collar are hook and loop mating straps so one will be a hook strap and the other a loop strap. This provides a removable attachment of the leg to the sandal so that when the equine lifts its leg the sandal will stay connected to the hoof and remain in proper position. This also helps prevent getting particles under the hoof that could cause discomfort when the equine steps down.

A preferred fabric for the collar is a custom woven anti-rub cover of UHMWPE (ultra high molecular weight polyethylene). The fibers have a very low coefficient of friction (significantly lower than nylon), are comparable to Teflon, are highly resistant to abrasion, and have extremely low moisture absorption.

Some practitioners working on laminitic horses like the pumping action of the simulated exercise boot (particularly if more than one bladder in the boot is used to provide pulsing in different areas of the hoof) but believe that there needs improved means to adjust the axis of the hoof as needed depending on the condition of the diseased hoof. The adjustable rocker attachment accomplishes that when coupled with the parented simulated exercise boot of U.S. Pat. No. 8,291,683

In use the adjustable rocker attached in attached to the underside of an equine boot as described above and the bladder inflated to adjust the structure shape as desired to accomplish a desired effect. Radiographs of the hoof during this procedure greatly facilitate accomplishment of desired goals.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded as illustrative rather than a restrictive. Therefore, the scope of the invention should be limited only by the appended claims.

The invention claimed is:

1. An equine boot assembly comprising: (i) an equine boot having a flexible upper section and a base sole attached to the flexible upper section, the base sole having a wall extending upward around at least some portion of its circumference, (ii) an elastomeric shock absorbing pad disposed inside the boot, and (iii) an adjustable rocker attachment structure disposed beneath the base sole of the boot and comprising: (1) an elastomer body with at least three securing tabs extending from sides of the elastomer body, wherein the elastomer body is constructed from an elastic polymer having a Shore A hardness of from about 70 to 100 and elasticity of at least 400%, and wherein the securing tabs are attached to the boot, thereby securing the elastomer body to an underside of the boot, and (2) an inflatable bladder disposed between the elastomer body and the base sole.

2. The assembly of claim 1 wherein the adjustable rocker attachment structure is attached to a side wall of the base sole of the boot by adhesive, brads, or bolts and nuts.

3. The assembly of claim 1 wherein an underside of the adjustable rocker attachment structure is patterned, with ridges on front and rear portions of the underside of the adjustable rocker attachment structure while retaining more flexibility in a center portion.

4. The assembly of claim 1 wherein the inflatable bladder has an inlet conduit and SCHRADER or PRESTA valve.

5. An equine boot assembly comprising:
(i) an equine boot having: (1) a flexible upper section, (2) a base sole having a wall extending upward around at least some portion of its circumference attached to the flexible upper section, (3) an elastomeric shock absorbing pad disposed inside the boot, and (4) a pressure pulsing means disposed both inside the boot and on, under, or within the shock absorbing pad; and
(ii) an adjustable rocker attachment structure disposed beneath the base sole of the boot and comprising: (1) an elastomer body with at least three securing tabs extending from the sides of the elastomer body, wherein the elastomer body is constructed from an elastic polymer having a Shore A hardness of from about 70 to 100 and elasticity of at least 400%, and wherein the securing tabs are attached to the boot, thereby securing the elastomer body to an underside of the boot, and (2) an inflatable bladder disposed between the elastomer body and the base sole.

6. The assembly of claim 5 wherein the pressure pulsing means comprises a fluid pump and inlet valves allowing fluid to pass via conduit to each of multiple of the boot assemblies, having pressure pulsing means, the fluid thereby inflating the pressure pulsing means, the inlet valves further allowing the fluid to flow to a reservoir, thus deflating the pressure pulsing means.

7. The assembly of claim 5 wherein the adjustable rocker attachment structure is attached to a side wall of the base sole of the boot by adhesive, brads, or bolts and nuts.

8. The assembly of claim 5 wherein the top side of the adjustable rocker attachment structure has a cavity sized to accept the inflatable bladder.

9. The assembly of claim 5 wherein the inflatable bladder has an inlet conduit and Schrader or Presta valve.

10. The assembly of claim 5 wherein an underside of the adjustable rocker attachment structure is patterned with ridges on front and rear portions of the underside of the adjustable rocker attachment structure, while retaining more flexibility in a center portion.

11. An assembly of a leg collar and an adjustable rocker attachment structure comprising: (i) an elastomer body with at least three securing tabs extending from sides of the elastomer body, wherein the elastomer body is constructed from an elastic polymer having a Shore A hardness of from about 70 to 100 and elasticity of at least 400%; (ii) a leg collar having a plurality of hook and loop straps mating with the at least three securing tabs and soft fabric member with tabs configured to encircle an equine leg above a hoof; and (iii) and inflatable bladder disposed above the elastomer body and configured to be dispose on an underside of the hoof; wherein the elastomer body configured to be dispose beneath the hoof.

* * * * *